J. W. GOSLING.
Spring and Side-Bar Connection for Vehicles.

No. 160,586.  Patented March 9, 1875.

Attest  
Th. Smith  
Edgar Gross

Inventor  
J. W. Gosling  
By H. Millward  
Attorney

UNITED STATES PATENT OFFICE.

JOHN W. GOSLING, OF CINCINNATI, OHIO.

IMPROVEMENT IN SPRING AND SIDE-BAR CONNECTIONS FOR VEHICLES.

Specification forming part of Letters Patent No. 160,586, dated March 9, 1875; application filed October 14, 1874.

*To all whom it may concern:*

Be it known that I, JOHN W. GOSLING, of Cincinnati, Hamilton county, State of Ohio, have invented a certain new and useful Improvement in Carriage-Spring Frames, of which the following is a specification:

My invention relates to a class of carriage-spring frames having side bars resting upon end springs secured to the axles of the carriages; and consists of a journal-bearing connection between said springs and bars. The object of the invention is to prevent the torsional strain upon the side bars.

Figure 1:
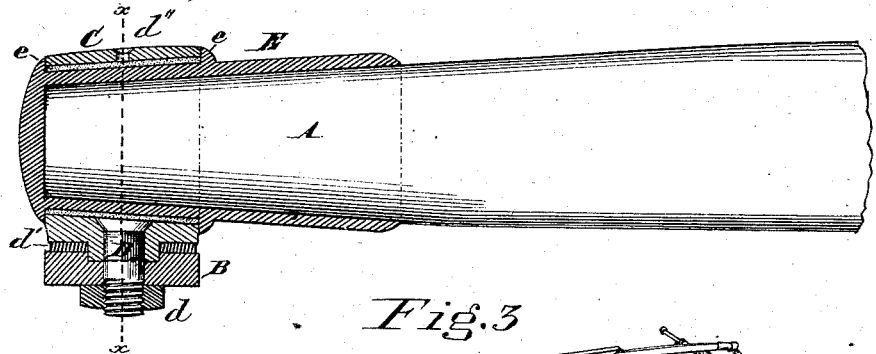
Figure 3:
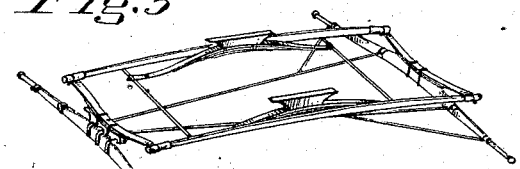
Figure 2:
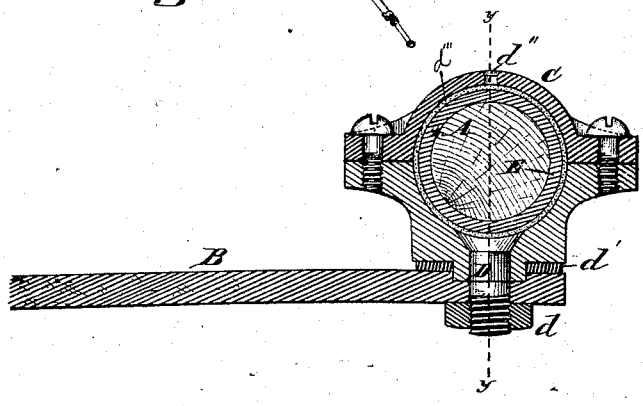

Figure 1 is a sectional elevation of the device, taken on the line $y\ y$, Fig. 2. Fig. 2 is a transverse section of the device. Fig. 3 is a perspective view of the spring-frame of a carriage.

A is the side bar of a carriage; and B, the end spring, attached to the axle of the carriage. C is a journal-bearing, secured to the spring B by means of bolt D and nut $d$, the bolt-head being planed to coincide with the inner surface of the bearing. The bearing is prevented from shackling by means of a rubber ring, $d'$. The side lever A of the carriage is fitted securely with journal-socket E, formed to fit loosely in bearing D, and having annular collars or shoulders $e$, to prevent lateral play. To prevent shackling in the joint, and also present a moderate resistance to oscillation, enough to render the frame staunch, I provide a layer, $d'''$, of leather, rubber, or other elastic material, between the bearing D and journal E. I supply the joint with oil through aperture $d''$.

When the spring B vibrates over the axle it must perforce assume a different relation to the bar D, and if the joint with the side bar were rigid it would tend to twist the side bar and ruin the fiber of the same; but as I provide a journal-bearing joint of above description, I also accordingly accomplish the desired object of preventing this torsional strain upon the side bar.

I claim—

The combination of spring B, side box A, and sleeve E, having ears $e\ e$, with elastic packing $d'''$ and divided socket C, attached by independent screws, all substantially as and for the purpose set forth.

In testimony of which invention I hereunto set my hand.

J. W. GOSLING.

Witnesses:
 EDGAR J. GROSS,
 J. L. WARTMANN.